(12) United States Patent
Ceglinski

(10) Patent No.: US 10,954,642 B2
(45) Date of Patent: Mar. 23, 2021

(54) WASTE COLLECTION DEVICE

(71) Applicant: SEABIN PTY LTD, West Perth (AU)

(72) Inventor: Peter Ceglinski, West Perth (AU)

(*) Notice: Subject to any disclaimer, the term of this patent is extended or adjusted under 35 U.S.C. 154(b) by 0 days.

(21) Appl. No.: 16/468,211

(22) PCT Filed: Dec. 6, 2017

(86) PCT No.: PCT/AU2017/051339
§ 371 (c)(1),
(2) Date: Jun. 10, 2019

(87) PCT Pub. No.: WO2018/102869
PCT Pub. Date: Jun. 14, 2018

(65) Prior Publication Data
US 2020/0011020 A1    Jan. 9, 2020

(30) Foreign Application Priority Data
Dec. 8, 2016  (AU) ................. 2016905066

(51) Int. Cl.
*E02B 15/10* (2006.01)
*B01D 35/05* (2006.01)
*C02F 103/00* (2006.01)

(52) U.S. Cl.
CPC ............ *E02B 15/10* (2013.01); *B01D 35/05* (2013.01); *E02B 15/106* (2013.01); *C02F 2103/007* (2013.01)

(58) Field of Classification Search
CPC ........ E02B 15/04; E02B 15/10; E02B 15/106; E04H 4/1209; E04H 4/1263; B01D 35/05; C02F 2103/007
USPC ........ 210/122, 167.1, 167.2, 170.05, 170.09, 210/170.1, 170.11, 242.1, 747.6, 776
See application file for complete search history.

(56) References Cited

U.S. PATENT DOCUMENTS

| | | | |
|---|---|---|---|
| 3,970,556 A * | 7/1976 | Gore | E02B 15/106 210/242.1 |
| 4,325,150 A * | 4/1982 | Buddy | E04H 4/1272 210/242.1 |
| 5,059,312 A * | 10/1991 | Galletti | B01D 17/0214 210/122 |
| 5,472,597 A * | 12/1995 | Carro | E02B 15/106 210/122 |
| 5,693,218 A * | 12/1997 | Yamamoto | E02B 15/106 210/122 |
| 6,159,362 A * | 12/2000 | Gilmore | B01D 17/0214 210/242.1 |

(Continued)

FOREIGN PATENT DOCUMENTS

| | | | |
|---|---|---|---|
| FR | 2831193 | * | 4/2003 |
| WO | WO 2017/139855 | * | 8/2017 |

*Primary Examiner* — Christopher Upton
(74) *Attorney, Agent, or Firm* — Tope-McKay & Associates

(57) ABSTRACT

A waste collection device (10) comprising a receptacle (12) having an opening (24) in an upper end and a tubular member (28) mounted for sliding movement within the opening (24). A pump is provided for pumping water outwardly from within the receptacle (12) and a basket is provided within the tubular member (28). The tubular member (28) comprises a cylindrical inner wall (32) and a cylindrical outer wall (33) connected at upper and lower ends thereof to define an annular chamber (36) to provide buoyancy to the tubular member (28).

15 Claims, 8 Drawing Sheets

(56) References Cited

U.S. PATENT DOCUMENTS

| | | | |
|---|---|---|---|
| 6,709,582 B2* | 3/2004 | Danner | A01K 63/045 |
| | | | 210/242.1 |
| 2010/0230338 A1* | 9/2010 | Happel | E03F 5/14 |
| | | | 210/170.03 |
| 2015/0247331 A1* | 9/2015 | Norberto, III | E04H 4/1263 |
| | | | 210/167.1 |

* cited by examiner

WASTE COLLECTION DEVICE

FIELD OF THE INVENTION

The present invention relates to a device for collection of waste from bodies of water.

BACKGROUND TO THE INVENTION

The amount of waste which finds its way into lakes, rivers and the oceans has become a significant environmental problem. The present invention relates to a device to be deployed within such bodies of water in order to collect floating waste for proper disposal.

The device proposed in the applicant's earlier Spanish Patent number 201330495 comprises a garbage collection device designed to be located adjacent the surface of a body of water. This device acts to draw water into the top of the receptacle, which is captured in an internal basket. Water is pumped out of the receptacle by an internal pump, thereby lowering the water level and causing the basket to fall, allowing inflow of water. As the water level rises, the basket moves again upwardly. While the device described operates reasonably effectively, the present invention aims to provide a garbage collection device having improved performance. The present invention relates to a waste collection device having features aimed providing improvements with regard to maintaining a more constant flow of water through the device and also coping with heavy loads within the basket.

SUMMARY OF THE INVENTION

According to one aspect of the present invention there is provided a waste collection device comprising;
a receptacle having an opening in an upper end, the receptacle being mounted relative to a body of water such that the upper end is adjacent a surface of the water;
a tubular member mounted for sliding movement within the opening;
a pump for pumping water outwardly from within the receptacle; and
a basket within the tubular member for extracting waste from water passing through the tubular member;
wherein the tubular member comprises a cylindrical inner wall and a cylindrical outer wall connected at upper and lower ends thereof to define an annular chamber to provide buoyancy to the tubular member.

Preferably the tubular member is dimensioned to be received within the opening in the upper end of the receptacle such that a central longitudinal axis of the tubular member is coaxial with a central longitudinal axis of the receptacle.

Preferably an outer surface of the tubular member engages with an inner surface of the opening such that a seal is created and water may enter the receptacle by passing through the tubular member.

In a preferred embodiment, the tubular member includes a rim extending outwardly from the periphery of the tubular member at a lower end thereof such that the rim engages with the edge of the opening when the tubular member is in an uppermost position.

Preferably the receptacle comprises a cylindrical side wall and a lower wall and wherein a top cover including the opening is securable to an upper end of the side wall of the receptacle.

In a preferred embodiment, the top cover is annular in shape such that the opening is circular and located centrally in the top cover.

Preferably the inner wall of the tubular member is provided with a plurality of ribs extending longitudinally down an inner surface thereof, the ribs defining a plurality of elongate channels such that some water may flow through the channels in the event that the basket is blocked.

Preferably the ribs extend downwardly from adjacent the upper end of the inner wall of the tubular member.

In one embodiment, the ribs are provided at equal angular spacings around the inner surface of the inner wall.

In one embodiment, the receptacle includes a tapered cylindrical side wall such that a lower end thereof is of a smaller diameter than an upper end.

Preferably a mounting frame is provided comprising an elongate member extending vertically adjacent the side wall of the receptacle and an interconnecting portion extending from a lower end of the elongate member to connect with a lower surface of the base wall of the receptacle.

In one embodiment, the elongate member and interconnecting portion have U-shaped cross sections.

In one embodiment, the elongate member is mounted for sliding movement relative to a fixed rail.

In a further embodiment, a float is connected to the mounting frame, the float comprising a hollow vessel fillable with ballast to adjust the vertical position of the receptacle relative to the surface of the water.

In one embodiment, the vessel includes an arcuate front surface adjacent the receptacle and a planar rear surface having a channel therein such that the elongate member and the rail are received within the channel.

In one embodiment, the vessel includes inwardly tapering side surfaces and planar horizontal upper and lower surfaces.

BRIEF DESCRIPTION OF THE DRAWINGS

The invention will now be described, by way of example, with reference to the following drawings, in which.

DETAILED DESCRIPTION OF PREFERRED EMBODIMENTS

Referring to the Figures, there is shown a waste collection device 10 comprising a receptacle 12 provided for capturing waste from adjacent the surface of a body of water.

The receptacle 12 in the embodiment shown is cylindrical such that the receptacle 12 comprises a cylindrical side wall 14 and a circular base wall 16. The cylindrical side wall 14 in the embodiment shown is tapered such that a lower end thereof is of a smaller diameter than an upper end thereof.

Figure 1:
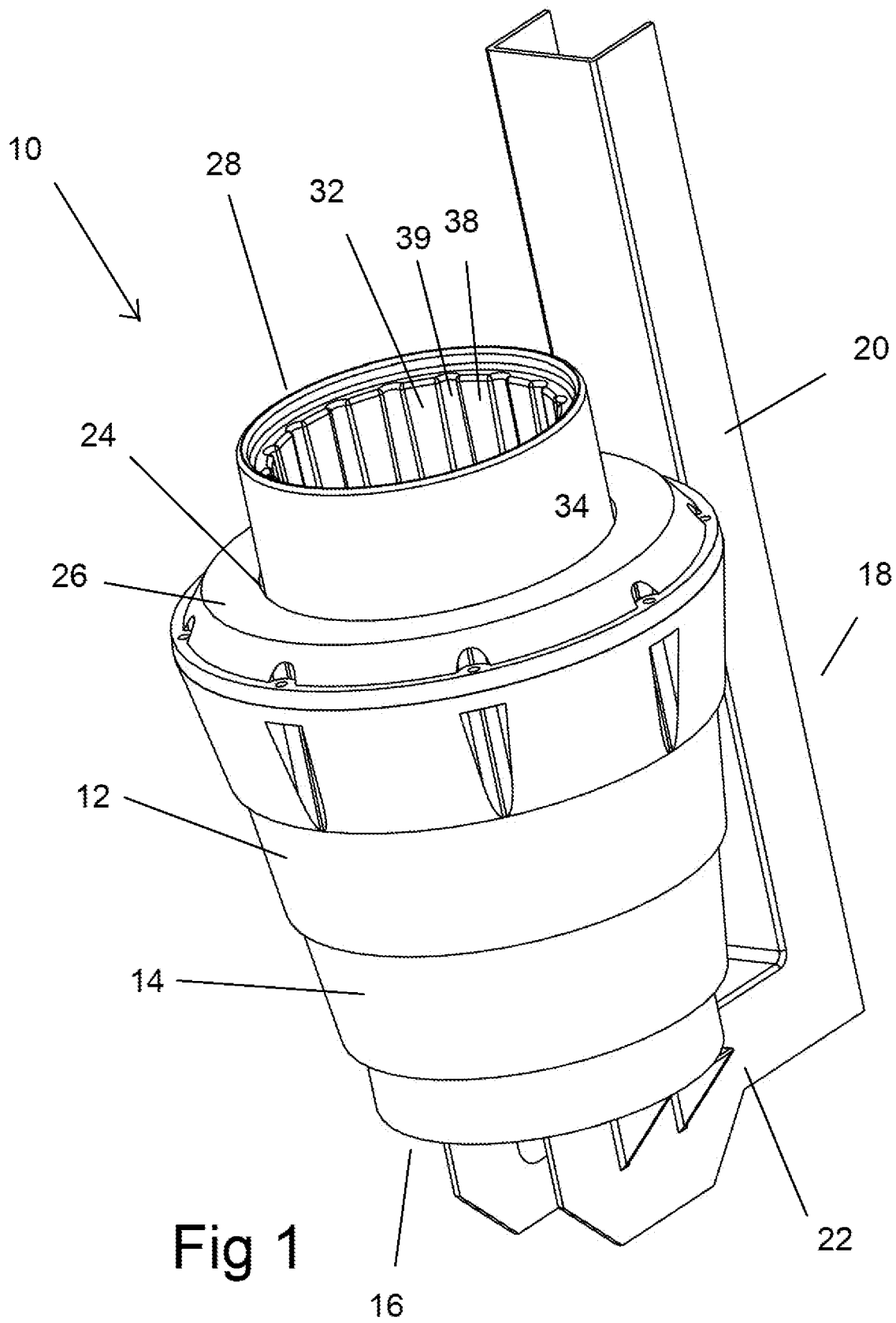
FIG. 1 is an upper perspective view of a waste collection device in accordance with the present invention.
Figure 2:
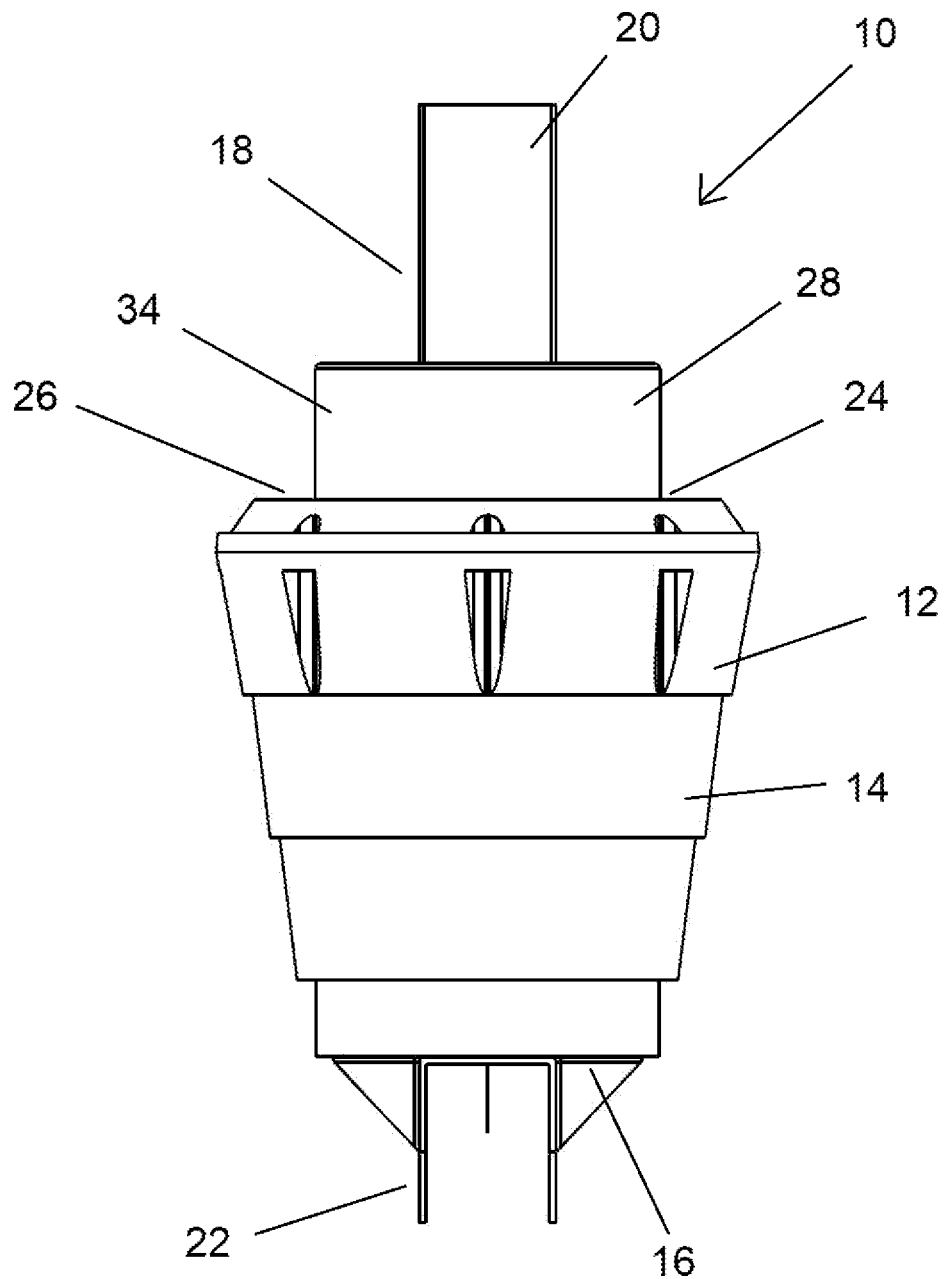
FIG. 2 is a front view of the waste collection device of FIG. 1.
Figure 3:
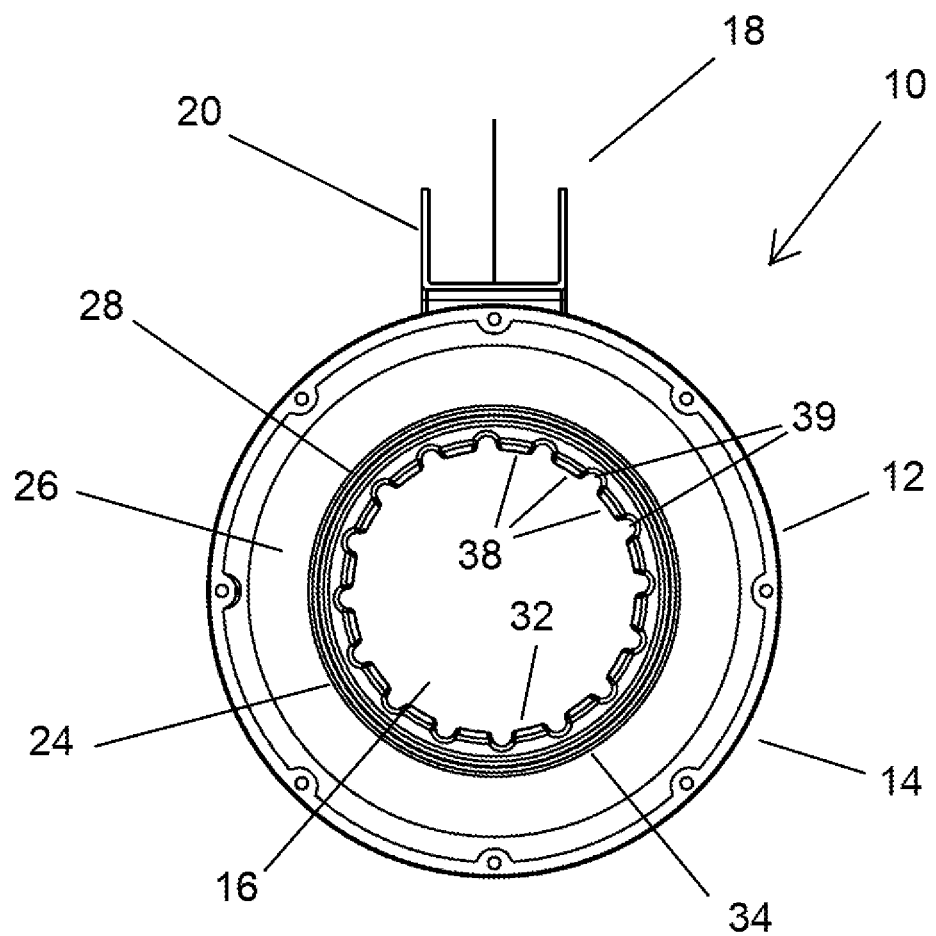
FIG. 3 is a top view of the waste collection device of FIG. 1.
Figure 4:
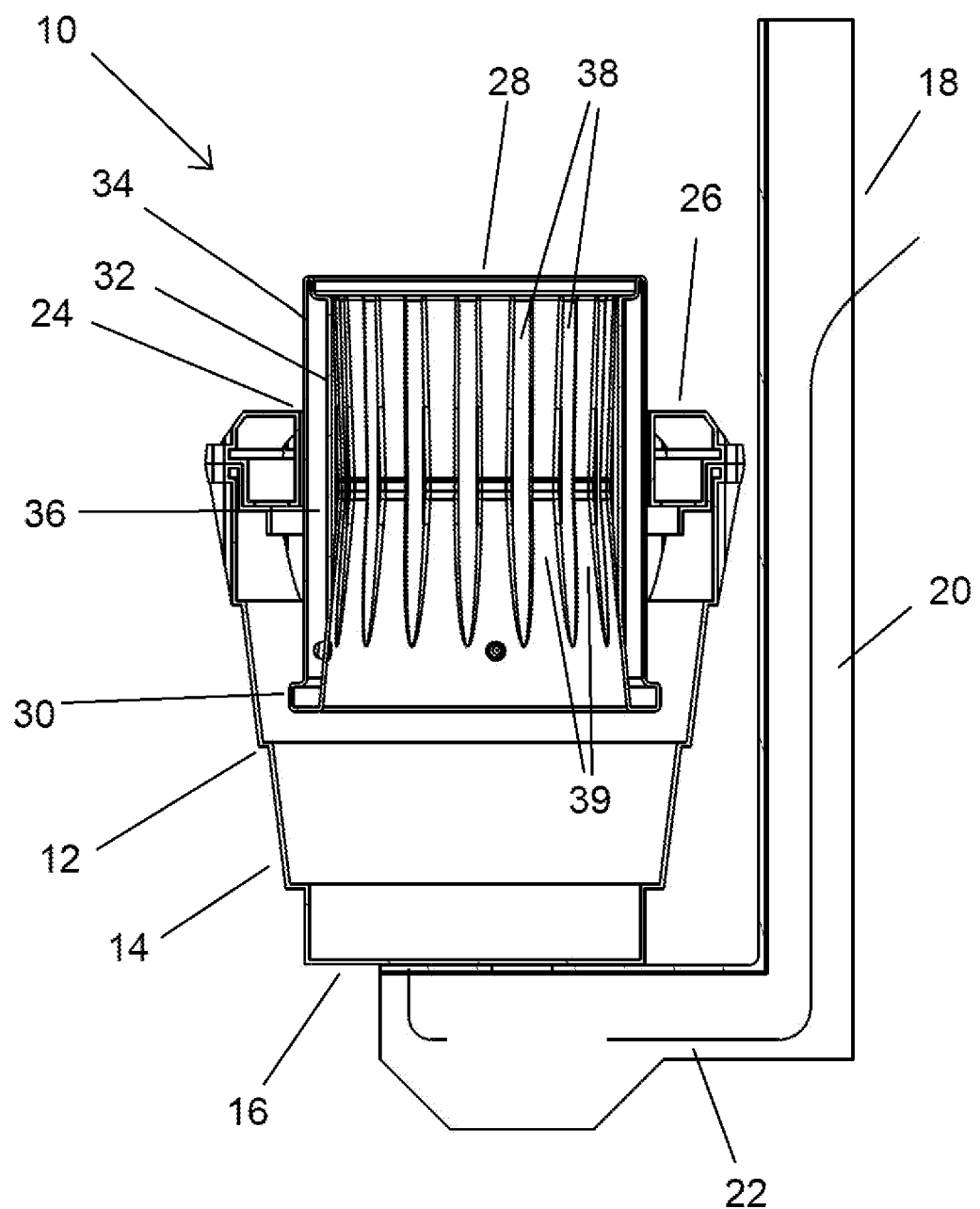
FIG. 4 is a side cross-sectional view of the waste collection device of FIG. 1.

The receptacle 12 is provided with a mounting frame 18, such that the receptacle 12 may be fixed at a location in a body of water such that upper end of the receptacle 12 is adjacent the surface of the water. The embodiment of FIGS. 1 to 4 may be suitable for fixing to a floating dock, such that the mounting frame 18 is fixed to the dock and the waste collection device 10 remains in a fixed position relative to the surface of the water as the floating dock moves.

The mounting frame 18 comprises an elongate member 20 which extends vertically adjacent a vertical side of the side wall 14 of the receptacle 12. The frame 18 includes also an interconnecting portion 22 extending from a lower end of the elongate member 20 to connect with a lower surface of the base wall 16 of the receptacle 12. The elongate member 20 is to be fixed in use to the object to which the waste collection device 10 is to be mounted. The elongate member 20 and interconnecting portion 22 in the embodiment shown comprise elongate members having a U-shaped cross section.

The waste collection device 10 includes an outlet (not shown) from which water may be pumped from the receptacle 12. The outlet comprises an opening in the base wall 16 of the receptacle 12. The waste collection device 10 includes a pump (also not shown) in connection with the outlet such that the pump operates to extract water from within the receptacle 12. The pump may be located externally and connected to the outlet via a conduit. Alternatively, the pump may be provided in or adjacent the receptacle 12 to pump water out through the outlet.

The receptacle 12 defines an opening 24 in an upper end thereof. The receptacle 12 includes a top cover 26 securable to an upper end of the side wall 14 thereof. The top cover 26 is provided to engage across the open upper end of the cylindrical receptacle 12 and includes the opening 24. In the embodiment shown, the top cover 26 is annular in shape such that the opening 24 is a circular opening located centrally in the top cover 26.

The waste collection device 10 includes also a tubular member 28. The tubular member 28 is dimensioned to be received within the opening 24 in the upper end of the receptacle 12 such that a central longitudinal axis of the tubular member 28 is coaxial with a central longitudinal axis of the receptacle 12. The tubular member 28 is arranged such that the tubular member 28 may slide upwardly or downwardly relative to the receptacle 12. An outer surface of the tubular member 28 engages with an inner surface of the opening 24 such that a seal is created and water may enter the receptacle 12 by passing through the tubular member 28.

The tubular member 28 includes a rim 30 at a lower end thereof. The rim 30 extends outwardly from the periphery of the tubular member 28 at the lower end thereof. The rim 30 is provided to engage with the periphery of the opening 24 in the annular cover 26 when the tubular member 28 is in an uppermost position.

The tubular member 28 comprises a cylindrical inner wall 32 and a cylindrical outer wall 34. The inner and outer walls 32 and 34 are coaxial and are connected at upper and lower ends thereof such that the inner and outer walls 32 and 34 define an annular chamber 36 within the tubular member 28. The annular chamber 36 provides buoyancy to the tubular member 28 and may be empty or filled with a buoyant material such as foam.

The tubular member 28 is provided with a basket (not shown). The basket has an upper end secured adjacent the open upper end of the tubular member 28. The basket hangs inside the tubular member 28 and comprises a mesh material such that when water flows downwardly through the tubular member 28, the basket captures waste material within the water and retains the waste material within the basket.

The basket may comprise a solid mesh frame or a flexible mesh bag. In one preferred embodiment, the basket comprises a hessian bag. It has been noted that hessian bags form a suitable filtering medium as the walls of the bag allow water to pass through and the fibres of the bag act to collect and thereby filter out smaller waste particles.

The inner wall 32 of the tubular member 28 is provided with a plurality of ribs 38 thereon. The ribs 38 extend longitudinally down the inner surface of the inner wall 32 from a location adjacent the upper end of the tubular member 28. The inner and outer walls 32 and 34 may be formed from a plastic material and the ribs 38 formed integrally with the inner wall 32. In the embodiment shown, the ribs 38 are provided at equal angular spacings around the inner surface of the inner wall 32.

The ribs 38 also define a plurality of elongate channels 39, each channel 39 being defined between a pair of adjacent ribs 38. The channels 39 defined by the ribs 38 allow flow of some water around the basket in the event that the basket has become blocked by collected waste. The channels 39 thereby reduce the likelihood of the pump running dry or damage being caused to the waste collection device 10 by the suction of the pump.

In use, the waste collection device 10 is located in a body of water such that the upper end of the receptacle 12 is adjacent and just below the surface of the water. When the interior of the receptacle 12 is empty, the tubular member 28 falls downwardly until the upper end thereof is adjacent the surface of the water. Water then flows downwardly through the tubular member 28 and into the receptacle 12. As the water level in the receptacle 12 rises, the tubular member 28 moves upwardly, thereby restricting the flow of water into the receptacle 12. As the pump extracts water from within the receptacle 12, the volume of water flowing in through the tubular member 28 balances the water being pumped out.

Due to the buoyant nature of the tubular member 28 and its arrangement within the receptacle 12, should a wave (such as the wash from a boat) cause a sudden inflow of water into the tubular member 28, the tubular member 28 rises up out of the water to restrict further inward flow of water.

The waste collection device 10 of FIGS. 1 to 4 may also be utilised in a location where it is anchored to the floor of the body of water, rather than connected to a floating object. In this case, the mounting frame 18 would be omitted.

Figure 5:
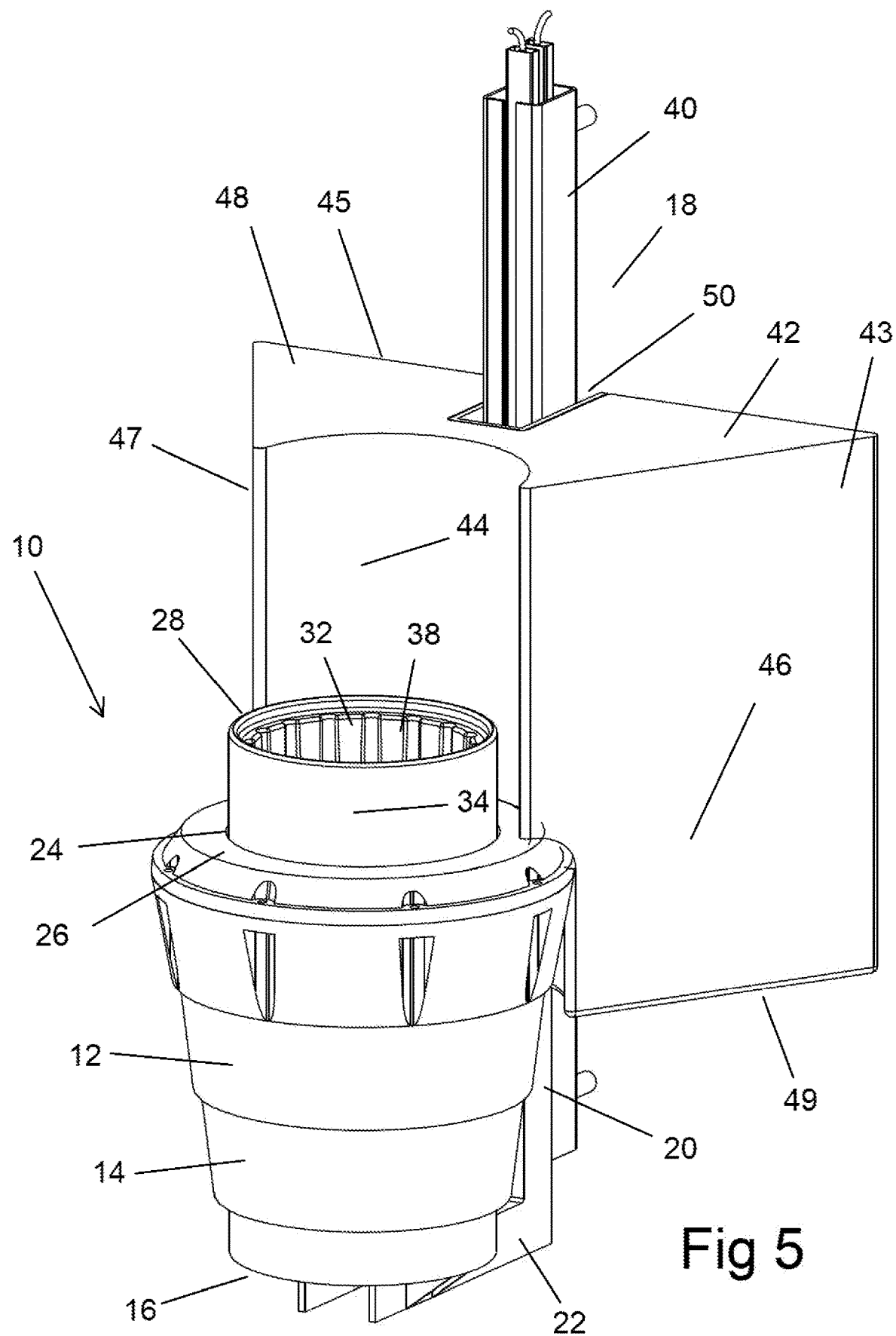
FIG. 5 is an upper perspective view of a second embodiment of a waste collection device in accordance with the present invention.
Figure 6:
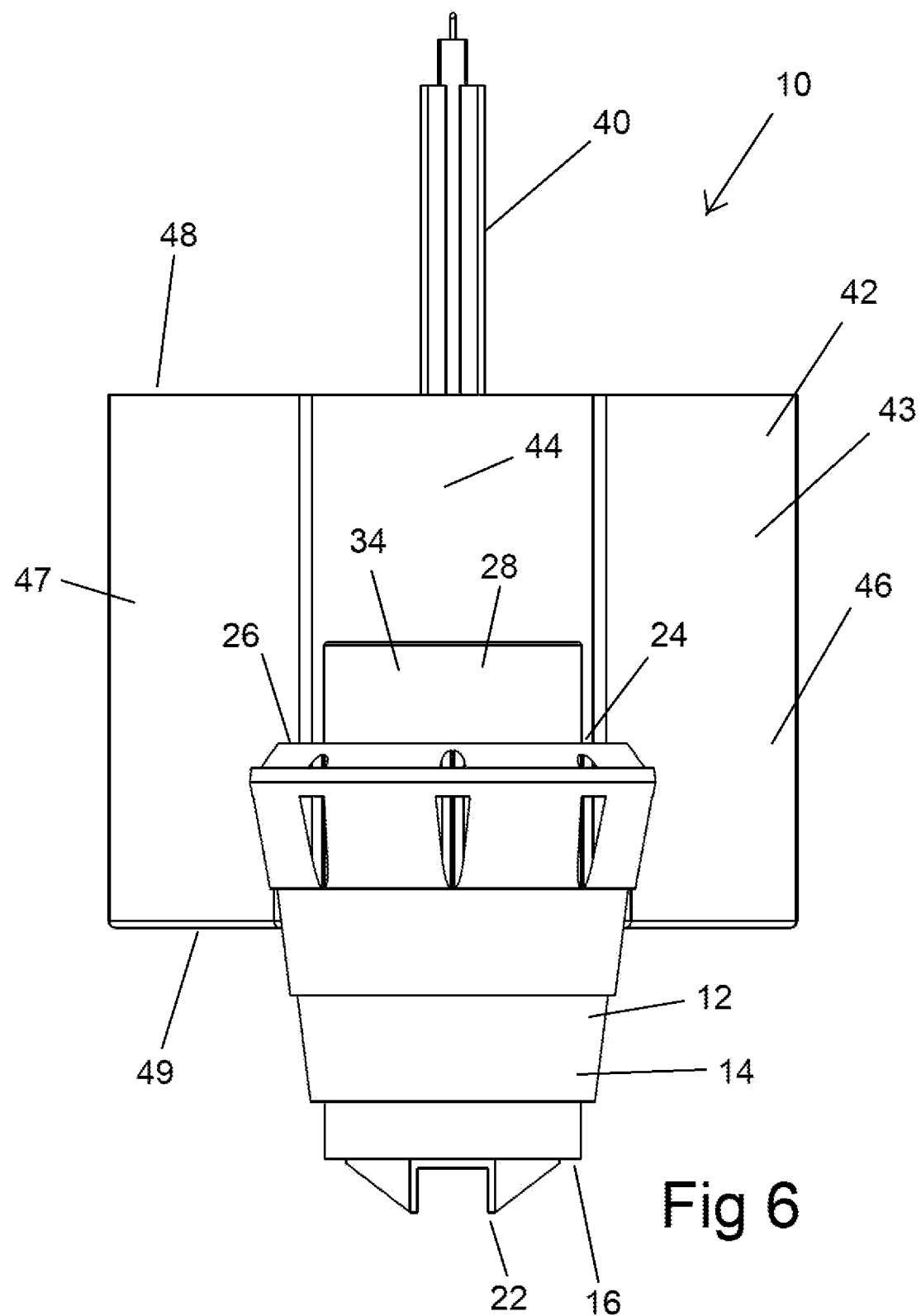
FIG. 6 is a front view of the waste collection device of FIG. 5.
Figure 7:
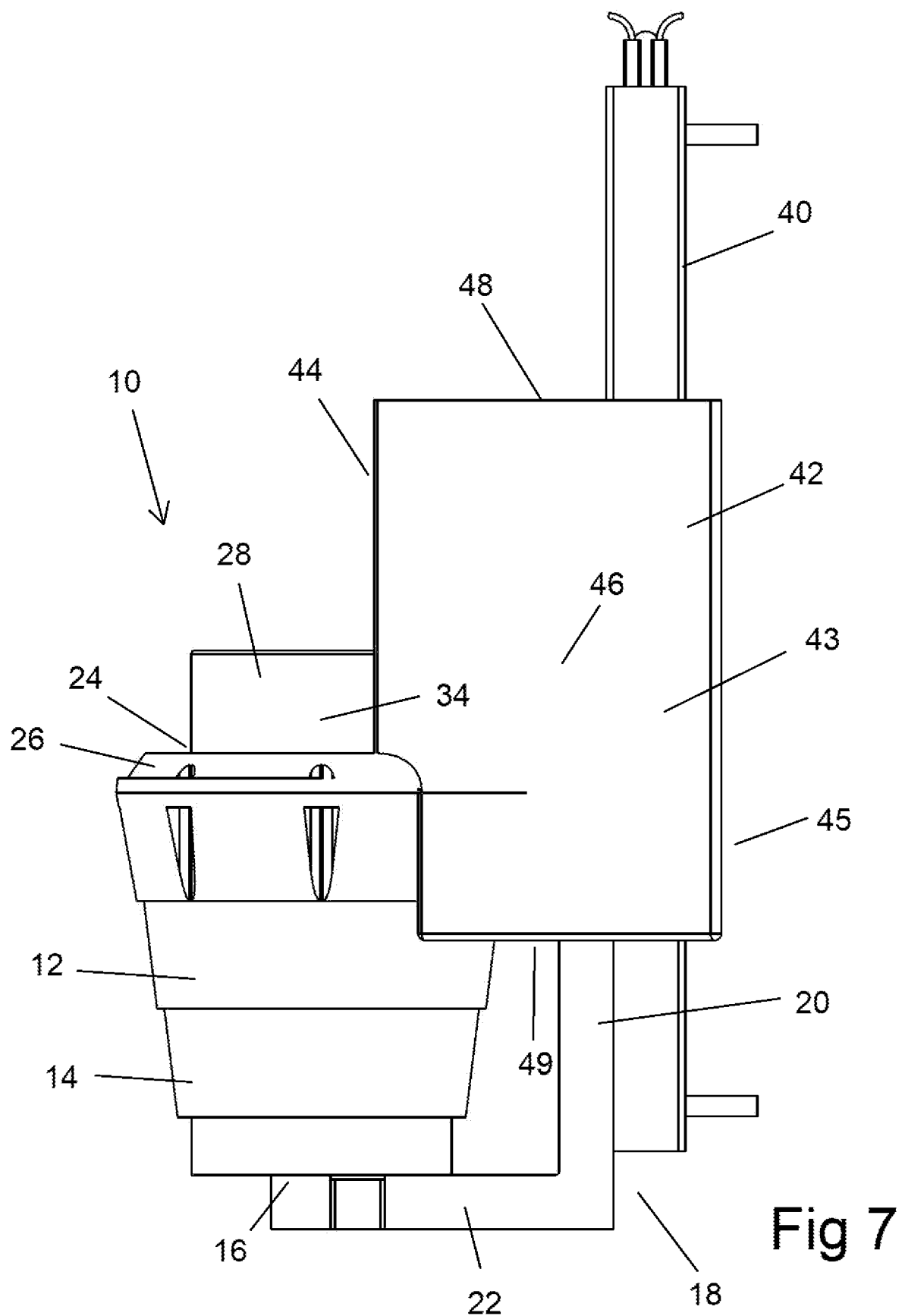
FIG. 7 is a side view of the waste collection device of FIG. 5.
Figure 8:
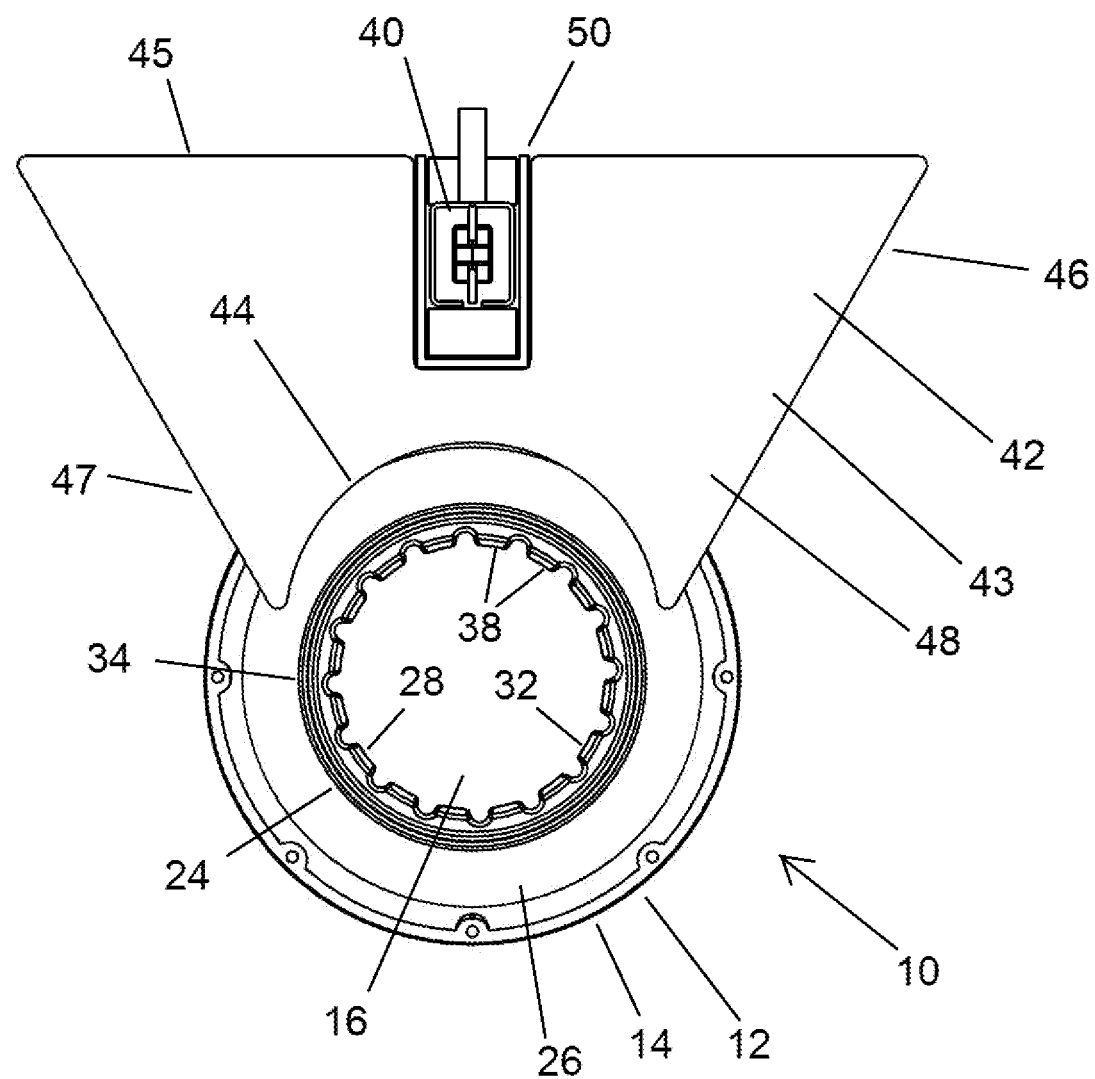
FIG. 8 is a top view of the waste collection device of FIG. 5.

FIGS. 5 to 8 show a second embodiment of a waste collection device 10 in accordance with the present invention. The waste collection device 10 of FIGS. 5 to 8 is similar to the first embodiment and like reference numerals are used to denote like parts.

The waste collection device 10 of FIGS. 5 to 8 is provided for mounting to a fixed location, such as a fixed dock or pylon. The elongate member 20 is mounted for sliding movement relative to a rail 40. The rail 40 is mounted vertically to the fixed location and to be received within the channel in the elongate member 20. A plurality of rollers are provided such that the elongate member 20 may slide vertically relative to the rail 40. The waste collection device 10 may therefore move upwardly or downwardly with changes in the position of the upper surface of the water relative to the object.

The waste collection device 10 is also provided with a float 42. The float 42 comprises a hollow vessel mounted to the mounting frame. In the embodiment shown, the vessel 43 includes an arcuate front surface 44 adjacent the receptacle 12, a planar rear surface 45 located remote from the receptacle 12, inwardly tapering side surfaces 46 and 47 and planar horizontal upper and lower surfaces 48 and 49. The rear surface 45 includes a channel 50 extending vertically therein such that the elongate member 20 and rail 40 are received within the channel 50.

The float 42 is fillable with ballast to vary the buoyancy of the float 42. In use, the waste collection device 10 is fitted to the rail 40 and the float 42 filled to a level to adjust the vertical position of the receptacle 12 to an appropriate position relative to the surface of the water. The waste collection device 10 then operates as described previously.

It will be readily apparent to persons skilled in the relevant arts that various modifications and improvements may be made to the foregoing embodiments, in addition to those already described, without departing from the basic inventive concepts of the present invention.

What is claimed is:

1. A waste collection device comprising;
   a receptacle having an opening in an upper end, the receptacle being mounted relative to a body of water such that the upper end is adjacent a surface of the water; and
   a tubular member mounted for sliding movement within the opening;
   wherein the tubular member comprises a cylindrical inner wall and a cylindrical outer wall, an upper end of the inner wall being located adjacent an upper end of the outer wall and being connected to the upper end of the outer wall and a lower end of the inner wall being located adjacent a lower end of the outer wall and being connected to the lower end of the outer wall such that the connected inner and outer walls define a closed annular chamber to provide buoyancy to the tubular member;
   wherein the inner wall of the tubular member is provided with a plurality of ribs extending longitudinally down an inner surface thereof, the ribs defining a plurality of elongate channels such that some water may flow through the channels.

2. The waste collection device in accordance with claim 1, wherein the tubular member is dimensioned to be received within the opening in the upper end of the receptacle such that a central longitudinal axis of the tubular member is coaxial with a central longitudinal axis of the receptacle.

3. The waste collection device in accordance with claim 1, wherein an outer surface of the tubular member engages with an inner surface of the opening such that a seal is created and water may enter the receptacle by passing through the tubular member.

4. The waste collection device in accordance with claim 3, wherein the tubular member includes a rim extending outwardly from the periphery of the tubular member at a lower end thereof such that the rim engages with the edge of the opening when the tubular member is in an uppermost position.

5. The waste collection device in accordance with claim 1, wherein the receptacle comprises a cylindrical side wall and a lower wall and wherein a top cover including the opening is securable to an upper end of the side wall of the receptacle.

6. The waste collection device in accordance with claim 5, wherein the top cover is annular in shape such that the opening is circular and located centrally in the top cover.

7. The waste collection device in accordance with claim 1, wherein the ribs extend downwardly from adjacent the upper end of the inner wall of the tubular member.

8. The waste collection in accordance with claim 7, wherein the ribs are provided at equal angular spacings around the inner surface of the inner wall.

9. The waste collection device in accordance with claim 1, wherein the receptacle includes a tapered cylindrical side wall such that a lower end thereof is of a smaller diameter than an upper end.

10. The waste collection device in accordance with claim 1, wherein a mounting frame is provided comprising an elongate member extending vertically adjacent the side wall of the receptacle and an interconnecting portion extending from a lower end of the elongate member to connect with a lower surface of the base wall of the receptacle.

11. The waste collection device in accordance with claim 10, wherein the elongate member and interconnecting portion have U-shaped cross sections.

12. The waste collection device in accordance with claim 10, wherein the elongate member is mounted for sliding movement relative to a fixed rail.

13. The waste collection device in accordance with claim 10, wherein a float is connected to the mounting frame, the float comprising a hollow vessel Tillable with ballast to adjust the vertical position of the receptacle relative to the surface of the water.

14. The waste collection device in accordance with claim 13, wherein the vessel includes an arcuate front surface adjacent the receptacle and a planar rear surface having a channel therein such that the elongate member and the rail are received within the channel.

15. The waste collection device in accordance with claim 14, wherein the vessel includes inwardly tapering side surfaces and planar horizontal upper and lower surfaces.

* * * * *